March 31, 1964 W. GEFFCKEN 3,127,155
APPARATUS FOR PREVENTING OR REDUCING THE CRYSTALLIZATION
OF MOLTEN GLASS AND THE ESCAPE OF VAPORIZATION PRODUCTS
FROM THE SURFACE THEREOF
Filed Feb. 16, 1960
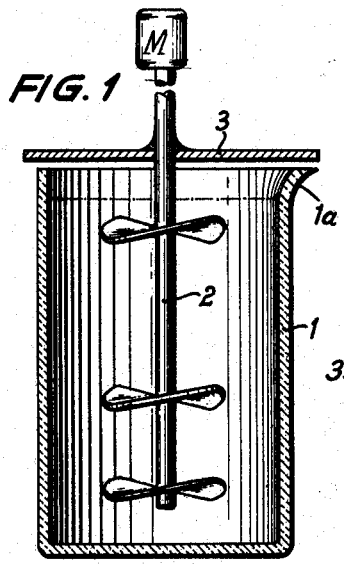
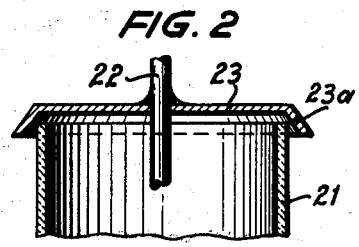
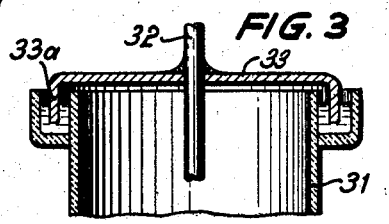
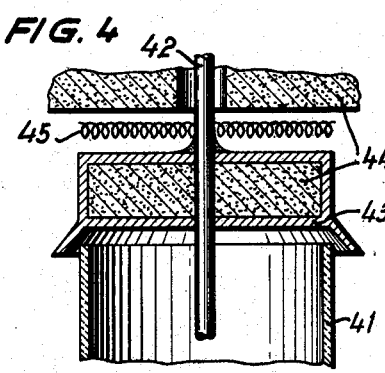
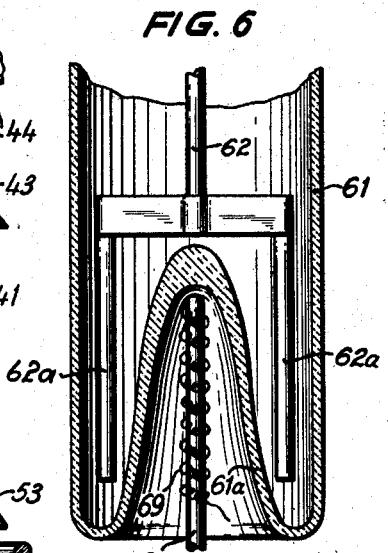
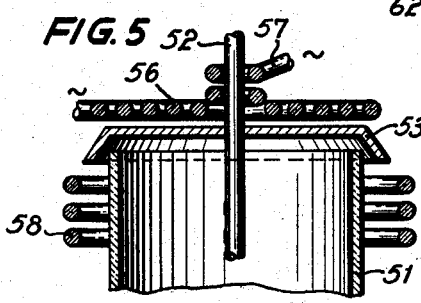
INVENTOR:
WALTER GEFFCKEN
By Burges, Dinklage + Sprung
ATTORNEYS United States Patent Office 3,127,155
Patented Mar. 31, 1964

3,127,155
APPARATUS FOR PREVENTING OR REDUCING THE CRYSTALLIZATION OF MOLTEN GLASS AND THE ESCAPE OF VAPORIZATION PRODUCTS FROM THE SURFACE THEREOF
Walter Geffcken, Mainz, Germany, assignor to Jenaer Glaswerk Schott & Gen., Mainz, Germany, a German corporation
Filed Feb. 16, 1960, Ser. No. 8,951
7 Claims. (Cl. 263—26)

The present invention relates to apparatus for preventing or reducing the crystallization of molten glass and the escape of products of vaporization from the surface thereof.

Unfortunately it is always found that glasses which possess very valuable properties and may be produced successfully in small quantities of, for example, 100 g., will when made in larger batches, be interspersed with crystals or will solidify even entirely in a crystalline condition. Although it is well known that certain materials which crystallize when cooled off slowly may be maintained in the original condition by being quickly chilled, this does not apply to the present case since, even though the small and large batches might be cooled off at an equal speed, a large batch will incline toward crystallizing to a considerably greater extent than a small batch.

The present invention proceeds from the concept that the decisive cause for the difference between the action of small and large batches may be found in the different speed at which the crystal nuclei are formed and that this difference is dependent upon the occurrence of different temperature gradients, especially in the vicinity of the glass surface.

In the conventional melting processes the most dangerous place for the formation of detrimental temperature differences is located at the cover of the crucible. The surface of the glass can usually radiate its heat freely partly through openings which are used for inserting the stirrer, while another part of the radiation will impinge upon surfaces which form relatively good heat conductors and communicate directly with the cold outer atmosphere and therefore have a much lower temperature than the molten glass.

Consequently, a layer with a strong vertical temperature gradient will be formed at the surface of the glass since the loss of heat by radiation is much stronger than the increase caused by the radiation from the walls of the crucible. The temperature of the glass surface will therefore be easily as much as 50° C. lower than the temperature at the inside of the glass. In the event that the overall temperature of the glass may be reduced to, for example, 950° C. without crystallizing too strongly, the temperature at the inside of the glass may, at a difference of 50° C. between the inside and the upper surface, not drop to a point lower than 1000° C. since the surface temperature will then already start to decrease to a point below the critical value of 950° C. The conditions become even worse due to the fact that the rate of speed of crystallization is considerably increased by the meeting of hotter and cooler layers of glass. Generally, this meeting may even form the most dangerous influence toward crystallization. When the glass is being stirred, the cold surface layers are continuously stirred toward the inside of the glass. If, therefore, small crystals have not already formed on the glass surface which are then mixed by the stirring with the uncrystallized glass and act as a center of a crystalline growth, crystal nuclei will at any rate be produced at a very great number by the meeting of cold and hot glass layers.

A further critical source for the formation of crystal nuclei is the surface of the stirrer since, strictly speaking, it must be regarded as forming a part of the crucible wall. If the stirrer consists of platinum, its shaft must be made very solid in order to transmit sufficient force at a high temperature. Consequently, it will also have a very high heat conductivity. Since the shaft of the stirrer usually extends upwardly into the cold outer atmosphere, it is bound to abduct the heat of the glass considerably so that in the vicinity of the shaft very strong temperature gradients will occur in the glass which are accompanied by the mentioned detrimental results.

Further extremely detrimental results are caused by the fact that the products of vaporization escape selectively from the surface of the molten glass. Such a vaporization, for example, of boric acid in certain highly refractory glasses, leads, because of the strongly retarded after-diffusion caused by the high viscosity of the glass, to a serious deficiency in this substance, for example, the boric acid, in the surface of the glass. Thus, it may occur that the surface may be of a composition which is outside of the stable glass range, with the result that small crystals will form spontaneously at that point. Even if the crucible is closed absolutely tight such a deficiency may occur if the cover is so cold that a condensation of the respective substance will occur thereon. On the other hand, the vapor pressure of the pure material is active at this point, which, although of the same temperature, is considerably higher than the vapor pressure of the same material in the molten glass, so that a condensation and thus a continuous sublimation of the ingredients of the molten glass upon the cover can occur only if the temperature thereof is to a certain amount lower than that of the surface of the molten glass.

It is an object of the present invention to provide an apparatus by means of which it is possible to overcome the above-mentioned disadvantages both insofar as the crystallization of the molten glass as well as the escape of products of vaporization are concerned.

The present invention is carried out by means of a melting crucible which is closed almost entirely toward the outer air, and it consists in controlling the supply and discharge of heat in such a manner that all parts of the walls of the crucible, including the elements which extend into the crucible, such as stirrers, will be of practically the same temperature.

Although a stirring vessel has already been proposed for distributing gases as intimately as possible in liquids, and in which the stirrers are solidly connected to the cover of the vessel, such means alone are not sufficient for attaining the objects of the present invention, but additional means must be provided to insure that all inner parts of the vessel will have the same temperature.

If the melting crucible according to the invention is closed by a well fitting cover which is heated to an adequate temperature, no temperature gradient can form on the surface of the molten glass and the stirring operation may be carried out until the temperature has dropped to a degree at which the inclination of the homogenous glass toward crystallization is still sufficiently small. The well fitting cover also produces the advantage that a saturated atmosphere of vaporization products will form over the molten glass so that a further vaporization will be prevented. The well fitting cover further insures that no dust which might act as crystal nuclei will reach the surface of the molten glass.

In those cases in which easily vaporizable fluorides are contained at a high degree of concentration within the molten glass, it is especially of importance that care be taken that the cover will have a sufficiently high temperature since the admissible difference in temperature between the surface of the molten glass and the cover is then very small. However, the present invention is of great value not only in those cases in which the glass is very easily liable to crystallize, but also in those cases in which a useful glass may not be attained by means of the known methods because of a strong volatility of certain ingredients of the glass or because of the occurrence of chemical reactions thereof with the outer air.

These and other objects, features, and advantages of the present invention will become further apparent from the following detailed description of several embodiments of apparatus which are suitable, particularly when this description will be read with reference to the accompanying diagrammatical drawings, in which—

FIGURE 1 shows a vertical cross section of a melting crucible with a cover according to the invention for closing the same;

FIGURES 2 and 3 show cross sections of two different modifications of the cover structure;

FIGURE 4 shows a cross section of a further modification of the cover according to the invention which is provided with heating means;

FIGURE 5 shows a cross section of a modification of the heating means; while

FIGURE 6 shows a partial cross section of a melting crucible of a special design which is also provided with a stirrer which is made in compliance with the shape of such a crucible.

According to the embodiments of the invention as illustrated in FIGURES 1 to 3, the required extent of closing the crucible 1 (21, 31 respectively) is attained by rigidly connecting the cover 3 (23, 33 respectively) to the shaft of the stirrer 2 (22, 32 respectively) so that the cover will be disposed at a short distance above the upper edge of crucible 1 (21, 31 respectively) and be rotatable with the stirrer. According to FIGURE 2, the edge 23a of cover 23 extends over the upper edge of crucible 21 and is drawn downwardly to a level below that upper edge.

In some extreme cases, that is, for example, when the molten glass will detrimentally react with the outer atmosphere, it may be preferable to operate with a tight closure, as shown in FIGURE 3, by providing a sealing liquid between the cover and the crucible. This sealing liquid may consist, for example, of an easily liquefiable fluoride such as the eutectic mixture of LiF, KF, and NaF which has a low melting point of approximately 300° C. Obviously, if the diameter of crucible 31 should be so large that the size of cover 33 might be too unwieldy, it is also possible to reduce the size of the crucible at its upper end to form a necklike portion which may have a diameter only slightly larger than the diameter of the shaft of the stirrer.

The means for maintaining the walls of the crucible as well as the cover and the stirrer at a substantially uniform temperature, may also be of various designs. The simplest procedure as illustrated diagrammatically in FIGURE 4 consists in making the rotating cover 43 of platinum and to provide a layer 44 of insulating material thereon. Additional heating means, for example, in the form of an electric heating coil 45, may also be provided above the rotatable cover 43 to prevent the dissipation of heat to a still greater extent.

It is, however, still more effective to omit a special insulation of the cover and to heat the latter to the desired temperature from above by special heating means. These heating means may consist, for example, of radiating electric heating elements, such as silicon rods or the like, which are mounted in a fixed position above the cover. It is then advisable also to make the necessary provisions that the shaft of the stirrer will also be sufficiently heated so that no dangerous heat losses will occur at this point.

If the crucible, which usually consists of platinum, is heated by means of a high or medium-frequency apparatus, the cover may be heated in a very simple manner by providing above the cover a flat coil 56, as shown in FIGURE 5 for heating the cover by induced eddy currents. This manner of heating produces a uniform heat distribution over the surface of the cover which may be very accurately regulated, is independent of the rotation of the cover, and permits the stirrer mechanism and the heating means to be made of a very light weight and so as to take up very little space. Also in this case it is advisable to provide a few additional coil windings 57 for heating the shaft of the stirrer.

Such a manner of heating by eddy currents by means of a coil 58 is also of great value for the crucible 51 itself since it easily permits the creation of the required marginal temperature conditions for avoiding the occurrence of large temperature gradients. In the conventional furnaces with external heating means there is usually a practically uncontrollable temperature gradient in the axial, that is, vertical direction whereby the energy discharge is substantially regulated during the cooling, whereas in the radial or horizontal direction very small temperature gradients are formed because of the necessary strong insulation of the furnace walls. It has, however, been found to be of a much greater advantage in crucibles of the usual shape which have a height greater than their diameter to discharge the energy primarily in a radial direction and to avoid a vertical gradient or, according to a further feature of the invention, to design this gradient so that the temperature will slightly and uniformly increase in the upward direction. This produces the result that convection currents within the crucible which are dependent upon the temperature will be prevented and that thus also the tendency of such currents to form crystals will be prevented. However, care must be taken that the gradient will not become too large since otherwise the small component of the vertical current which is caused by the stirring operation, and which cannot be entirely avoided, may again lead to the formation of crystal nuclei. It is for this reason advisable to design the gradient so that the temperature of the crucible will be about 20° C. higher at the upper end than at the lower end.

FIG. 6 illustrates the lower part of a melting crucible 61 which has a bottom 61a which is drawn inwardly so as to bulge strongly upwardly at the center. The recess which is thus formed underneath the bottom is occupied by additional heating means, for example, heating coils 69. The stirrer 62 for this crucible is designed in accordance with the shape of the bottom 61a and is made, for example, of a bifurcated shape at its lower end 62a. The recess in the bottom may further be provided with a tube 60 through which cooling air may be supplied, when desired. This tube may also serve as a support for the heating coils 69.

Since the proper operation of the different embodiments of the apparatus according to the invention requires a more accurate construction as well as greater cleanliness in the operation than the conventional crucibles, it is advisable not to pour out the stirred glass over the edge of the crucible but through a tubular spout 1a as on a watering can which terminates into the crucible near the bottom thereof. Obviously, this tubular spout must also be provided with heating means in order to prevent any crystallization from occurring therein.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An apparatus for treating and for melting glass in a platinum crucible while at least substantially reducing the tendency of the molten glass to crystallize and while preventing the loss of vaporization products from the surface of the molten glass, which comprises a melting crucible for the glass, means for heating said crucible, a rotatable shaft extending into said crucible, means for rotating said shaft, at least one stirring element carried by said shaft, means carried by said shaft for heating said shaft and stirring element, a cover rigidly secured to said shaft and rotatable therewith arranged at a small distance from the upper edge of said crucible so as to substantially seal the same against the atmosphere, said cover being provided with a heating means.

2. An apparatus according to claim 1, in which said cover is provided with a peripheral edge portion overlapping the upper edge portion of the crucible.

3. An apparatus according to claim 2, in which said peripheral edge portion of said cover extends downwardly over and to below said apparatus portion.

4. Apparatus according to claim 3, including an annular container secured to the wall of said crucible near the upper edge portion thereof and adapted for holding a sealing liquid, the downwardly extending edge portion of said cover extending into said annular container and into said sealing liquid so as to seal said crucible entirely against the atmosphere.

5. Apparatus according to claim 4, in which said means for heating said cover comprise at least one induction coil.

6. Apparatus according to claim 1 in which at least one juxtaposed induction coil, a portion of which forms said heating means for said shaft, stirring element, and cover, is provided for supplying heat to said cover, said crucible walls and said shaft.

7. Apparatus according to claim 1, in which the bottom portion of said crucible is drawn upwardly so as to form an annular bottom portion and a hollow recess, the stirrer is provided with means to extend into said annular bottom portion.

References Cited in the file of this patent

UNITED STATES PATENTS

| | | |
|---|---|---|
| 1,493,838 | Barron et al. | May 13, 1924 |
| 1,805,469 | Dufour | May 19, 1931 |
| 1,851,984 | Rennerfelt | Apr. 5, 1932 |
| 1,979,126 | Wait | Oct. 30, 1934 |
| 2,041,486 | Richalet | May 19, 1936 |
| 2,088,604 | Littlefield | Aug. 3, 1937 |
| 2,731,809 | Hackney | Jan. 24, 1956 |
| 2,781,948 | Emmons | Feb. 19, 1957 |
| 2,877,280 | Eden | Mar. 10, 1959 |

FOREIGN PATENTS

| | | |
|---|---|---|
| 662,684 | France | Aug. 9, 1929 |

OTHER REFERENCES

Handbook of Glass Manufacture, vol. II (Tooley), published by Ogden Pub. Co. (New York, N.Y.), 1960, p. 264, paragraph 7 relied on. (Copy in Div. 91.)